United States Patent [19]
Wirth et al.

[11] Patent Number: 5,921,215
[45] Date of Patent: Jul. 13, 1999

[54] FOUR-STROKE INTERNAL COMBUSTION ENGINE WITH SPARK IGNITION

[75] Inventors: Martin Wirth, Mayersdorf; Walter Piock, Niederberg, both of Austria

[73] Assignee: AVL List GmbH, Graz, Austria

[21] Appl. No.: 08/829,344

[22] Filed: Mar. 31, 1997

[30] Foreign Application Priority Data

Apr. 1, 1996 [AT] Austria .................................. 181/96 U
Sep. 12, 1996 [AT] Austria .................................. 534/96 U

[51] Int. Cl.$^6$ ...................................................... F02B 3/04
[52] U.S. Cl. .......................... 123/298; 123/307; 123/302
[58] Field of Search .................... 123/298, 301, 123/302, 305, 307, 308, 309, 661

[56] References Cited

U.S. PATENT DOCUMENTS

| | | | |
|---|---|---|---|
| 4,759,323 | 7/1988 | August .................................. | 123/193.6 |
| 5,127,379 | 7/1992 | Kobayashi et al. ..................... | 123/302 |
| 5,622,150 | 4/1997 | Fraidl et al. ............................. | 123/307 |
| 5,727,520 | 3/1998 | Wirth et al. ............................. | 123/305 |

FOREIGN PATENT DOCUMENTS

| | | |
|---|---|---|
| 0558072 | 9/1993 | European Pat. Off. .. |
| 0694682 | 1/1996 | European Pat. Off. .. |
| 2308700 | 8/1973 | Germany . |
| 2926489 | 1/1981 | Germany . |

OTHER PUBLICATIONS

SAE Paper No. 940188 by Lawrence W. Evers, "Characterization of the Transient Spray from a High Pressure Swirl Injector."

Abstract, RU 2013584–C1, "IC Engine Operating Procedure . . . ", May 30, 1994.

Abstract, JP 60–187714 (A), "Combustion Chamber of Diesel Engine", Sep. 25, 1985.

*Primary Examiner*—Willis R. Wolfe
*Assistant Examiner*—Arnold Castro
*Attorney, Agent, or Firm*—Watson Cole Grindle Watson, P.L.L.C.

[57] ABSTRACT

In order to optimize combustion in a four-stroke spark-ignition engine with direct fuel injection, the conditions of charge flow are improved by providing the top surface of each piston with an essentially T-shaped configuration of guiding ribs, i.e., a longitudinal rib extending transversely to the crankshaft axis running and a cross-rib running in the direction of the crankshaft axis.

21 Claims, 3 Drawing Sheets

FOUR-STROKE INTERNAL COMBUSTION ENGINE WITH SPARK IGNITION

BACKGROUND OF THE INVENTION

The present invention relates to a four-stroke internal combustion engine with spark ignition and direct injection of the fuel into the combustion chamber, with a reciprocating piston for each cylinder and a roof-shaped top of the combustion chamber with one or more exhaust valves and two or more intake valves as well as intake ports generating a tumble flow in the combustion chamber and arranged on one side of the longitudinal center plane of the engine defined by the axes of crankshaft and cylinder, as well as a fuel injection device opening into the combustion chamber, and an ignition source located in the area of the cylinder axis in the roof of the combustion chamber.

DESCRIPTION OF THE PRIOR ART

Ever stricter demands concerning the reduction of fuel consumption and exhaust emissions, in particular hydrocarbon and nitrogen oxide emissions, necessitate the use of new technologies in internal combustion engines, above all in engines of the spark-ignition type that are predominant in the automobile industry.

One of the main reasons why the specific fuel consumption of a spark-ignition engine is higher than that of a diesel engine, is that the spark-ignition engine operates on a premixed, homogeneous fuel-air mixture. This requires control of the engine load by means of a throttling element limiting the total intake of fuel-air mixture (regulation by quantity).

Throttling the intake flow leads to a thermodynamic loss, which will increase fuel consumption of the engine. If such throttling is avoided, potential fuel savings amount to an estimated 25 percent.

Full use of the fuel saving potential is made possible by direct fuel injection and largely unthrottled engine operation, such that a spark-ignition engine may be operated in a manner similar to a diesel engine, using regulation by quality, i.e., control of the engine load by variation of the fuel-air ratio.

This mode of operation demands specific measures to safeguard complete and stable combustion even with a very high proportion of air in the mixture (low engine load), i.e., when a homogeneous fuel-air mixture is no longer ignitible.

This problem is commonly solved by providing for a strongly stratified, i.e., inhomogeneous, distribution of the mixture, which may be advantageously attained in the instance of direct fuel injection by injecting the fuel just before ignition takes place.

The mixture stratification thus generated by direct fuel injection must be stabilized by the main flow structures in the cylinder space of the internal combustion engine and by the geometry of the combustion chamber, in order to outlast the time-span between the end of injection and the beginning of ignition, even in the presence of the typically high turbulence levels of the internal flow. Main flow forms in this context are swirl and tumble movements. In the instance of a swirl movement the cylinder charge rotates about the cylinder axis due to the specific design of the intake passage, whereas a tumble flow is characterized by the charge rotating about an axis parallel to the crankshaft.

An intake-generated tumble vortex exhibits accelerated rotation due to a reduction of the cross-sectional area during compression. On the other hand the tumble flow is somewhat less stable than a swirl flow rotating about the cylinder axis, with a tendency to divide into more complex secondary vortices. In the final phase of compression strong disintegration of the tumble vortex into smaller, stochastically distributed vortices may be observed if the valve angle (of a typical four-valve combustion chamber) is sufficiently flat. A tumble flow may be generated in the cylinder space of a modern, multivalve, spark-ignition engine with 2 or 3 intake valves without risking significant reductions in the flow coefficients of the intake ports. As a consequence, tumble flows are frequently used flow designs for spark-ignition engines in which the combustion characteristics are to be improved by means of increased charge movement.

For the delivery of fuel into the combustion chamber under the above flow conditions an injection valve is presented in SAE Paper 940188, which produces a cone-shaped injection jet with excellent fuel atomization. By changing the fuel pressure and the counterpressure in the combustion chamber the angle of the injected spraycone may be influenced. A typical property of such injection nozzles is the improvement of atomization quality with rising injection pressure. This desired dependence will lead to increasing velocities of the injection jet of up to 100 m/s, however, accompanied by a high momentum of the fuel spray entering the combustion chamber. By contrast, the air flow in the combustion chamber, even in the presence of strong intake-generated swirl or tumble movements, exhibits a far smaller momentum (not more than 30–40 m/s), such that the injection jet in a first phase of entrance into the combustion chamber is only slightly influenced by the flow movements prevailing therein.

In view of the above considerations the main task to be accomplished is to transform the injection jet into a locally concentrated fuel-air spraycloud, which must be advanced from the nozzle of the injection valve to the spark plug, and to further mix the mixture inside this cloud with the air in the combustion chamber. In this context the following points are essential:

The fuel-air spray must maintain its compact shape, especially at low engine loads, and should possibly be kept in the center of the combustion chamber, for thermodynamical reasons and in order to reduce the emissions of unburnt hydrocarbons.

Evaporation of the injected fuel and its mixing with the air in the combustion chamber to a preferably stoichiometric air ratio must be effected in the comparatively short time span between injection and ignition.

At the spark plug there should prevail a low mean flow velocity, together with a high turbulence level, to promote ignition of the fuel-air spray by the spark.

In developing a suitable combustion process for a spark-ignition engine with direct fuel injection, the particular dimensions of the combustion chamber must be taken into account as well as the characteristics of injection jet propagation. In an automobile engine of the spark-ignition type typical volumes of the individual cylinders lead to bore diameters of 60–100 mm, the piston lift approximately being in the same order of magnitude.

In view of the above propagation velocities of the injection jet at least part of the fuel spray is expected to hit the surface of the piston. For this reason the design of the flow movements inside the combustion chamber should take into account this wetting of the walls.

In shaping the spraycloud and preparing the fuel-air mixture the following effects may be utilized:

deflection of the high momentum of the injection jet towards the spark plug by means of the piston surface, high injection pressure to improve atomization, thus accelerating direct evaporation of the fuel spray before it reaches the wall, generation of a higher turbulence level in the area of the injection jet by means of the flow movements inside the combustion chamber, acceleration of wall film evaporation by generating a high flow velocity in the wetted area of the piston surface.

EP 0 558 072 A1 is concerned with an engine design in which the intake ports are shaped and arranged such that a reverse tumble movement of the flow inside the combustion chamber is generated. This movement is amplified by adding a ramp-shaped projection to the surface of the piston. The piston surface also serves to deflect the injection jet towards the spark plug which is located in the cylinder center. In this way the injection jet and the flow in the combustion chamber pass along the piston surface in the same direction. The injection jet, or rather, the fuel-air spray into which the jet is transformed after its deflection at the piston, is permitted to propagate in all directions almost unimpeded, however, after having reached the cylinder head wall in the vicinity of the spark plug. No efforts are made at compacting the spraycloud after its deflection at the piston. Furthermore, the ramp-shaped projection on the piston surface produces a compression face underneath the exhaust valves. As a consequence, an additional, desirable, flow movement is created during engine compression just before the upper dead center, which is reversed, however, on the return move, thus tearing apart the compact mixture built up during the compression stroke. Another variant of an internal combustion engine with direct fuel injection in presented in EP 0 694 682 A1, in which the intake ports are shaped such that a swirl flow is generated in the cylinder space. The piston surface has a clearly defined recess surrounded by a compression face, the recess being positioned eccentrically such that the spark plug in the center of the combustion chamber and the radially positioned injection valve are located at the edge of the recess. Fuel injection is directed towards the edge of the recess which is specifically designed for this purpose. In this instance the surface of the piston is primarily employed for diversion of the fuel jet. The task of the swirl flow is to advance the fuel diverted from the edge of the recess towards the spark plug.

If we assume that the principal unit of a spark-ignition engine with direct fuel injection is an aggregate with two or more intake valves per combustion chamber for optimum cylinder charging, one main problem in designing the combustion process is presented by the arrangement of the components, since both spark plug and injection nozzle must be accommodated in the cylinder head, the two having about the same dimensions.

To ensure reliable ignition and stable combustion the injection nozzle was frequently placed in close vicinity of the spark plug in previous arrangements. Placing the injection nozzle next to the spark plug will inevitably reduce valve diameters, however, thus leading to undesirable performance losses. If the optimized valve diameters realized in multivalve spark-ignition engines are to be maintained, the only suitable location for the injection nozzle is between the valves near the cylinder wall. Positioning the injection nozzle in the roof of the combustion chamber, laterally between an intake and an exhaust valve, seems to be of special advantage in this context. Although this configuration demands greater design efforts for integration of the injection nozzle into the structure of the cylinder head, these demands have no influence on the design of the intake ports. In order to obtain a maximum inclination of the injection jet towards the cylinder center even with a limited inclination angle of the nozzle, the use of injection nozzles makes sense in which the symmetry axis of the injection jet is inclined relative to the symmetry axis of the nozzle.

Positioning the injection nozzle at a comparatively large distance from the spark plug which is preferably placed in the center of the combustion chamber, will make high demands on the combustion process. The fuel jet must travel a good distance from the nozzle to the ignition location, which is accompanied by a greater time lapse between injection and ignition. In view of the generally high turbulence level in the combustion chamber the two factors will render it more difficult to maintain a compact fuel-air spraycloud with small cyclical fluctuations, which is indispensable for attaining a stable and accurately replicable combustion process in each engine cycle.

Repetitive accuracy of the spatial propagation process may be significantly improved if the flow movement inside the cylinder has an ordered structure of high stability throughout the compression phase.

SUMMARY OF THE INVENTION

It is an object of this invention to avoid the above drawbacks and to favorably influence the charge flow inside the combustion chamber so as to permit optimum combustion under the above conditions and based on the principal assumption of an intake-generated tumble flow prevailing in the cylinder space of the internal combustion engine, with special emphasis on the following tasks:

assisting in forming a basic tumble flow during the suction phase, efficient transformation of the basic tumble flow into increased turbulence during the late compression phase, deflection of the injection jet towards the spark plug, guiding of the fuel-air stream to minimize cyclical fluctuations in mixture distribution.

In the invention this is achieved by providing the piston on its top surface next to the combustion chamber with a substantially T-shaped configuration of flow guiding ribs, of which a longitudinal rib is placed transversely to the crankshaft axis, and a cross-rib, which is located at a distance from the cylinder axis, runs approximately in the direction of the crankshaft axis, i.e., preferably approximately in parallel with the crankshaft axis in at least one point, the fuel injection device being located in the cylinder head in the area of the longitudinal center plane of the engine, and the top face of the piston preferably assuming a continuously curved, concave shape between the guiding ribs and the outer edge of the piston, and the injection jet being directed towards one of the concave areas obtained in this manner.

This configuration will allow for the flow transformation typically occurring during compression, when the tumble vortex is transformed into two vortices rotating in opposite directions, whose rotational axes have a tendency to align themselves in parallel with the cylinder axis during the compression phase. This flow form, which is produced by a "tipover" of the tumble vortex rotating in parallel with the crankshaft axis, is also referred to as omega tumble. The air flow generated in this process sweeps along the piston surface from the intake to the exhaust side, and is directed upwards by the cross-rib in the central area of the cylinder. This flow is further increased by the top face of the piston, part of which lies below a reference plane through the outer edge of the piston, i.e., on the side facing the crankshaft.

To ensure flow separation of the injection jet advancing towards the cylinder center across the longitudinal rib and of the air flow swept along by it, the longitudinal rib is advantageously provided with a rounded upper edge, whose curved part smoothly joins with the concave top face of the piston, the radius of the curved part of the longitudinal rib preferably amounting to 1 to 3 mm, and preferably assuming its smallest value in the area of the longitudinal center plane of the engine.

In a possible variant an asymmetrical charge flow is obtained in the combustion chamber by providing that the distance between the longitudinal rib and the cylinder axis as measured in the direction of the crankshaft axis should be not more than 0.2 times the piston diameter in the area of the longitudinal center plane, and preferably 0.1 times the piston diameter. This asymmetrical design could also be taken into account with the intake flow, by superimposing a slight swirl component on the tumble flow, for example, by asymmetrical arrangement of the ports, or slight throttling of one of the intake passages.

It is preferably provided that there be a continuous transition between the longitudinal rib and the cross-rib on the intake side. In this way the tumble flow may be stabilized during the intake phase, it being an advantage in the above variant of the invention if the longitudinal rib assumes a curved shape if viewed in the direction of the cylinder axis, and if it has, preferably in the area of the cylinder axis, the greatest distance from a plane containing the cylinder axis and being normal to the crankshaft axis.

It is provided in a preferred variant that the cross-rib be positioned, at least predominantly, on the intake side, and that the distance between cross-rib and cylinder axis, as measured normally to the longitudinal center plane of the engine, be 0.1 to 0.45 times the piston diameter.

To attain optimum guiding of the flow it is of further advantage if the longitudinal rib have the greatest possible height, i.e., at least partly. This height is defined by the contour of the roof of the combustion chamber when the piston is in upper dead center, and by the necessary valve clearance. Since the longitudinal rib will approach the roof of the combustion chamber with only a few millimeters clearance, the latter is practically divided into two partial chambers during the short time-span of upper dead center, fuel delivery taking place only in one of these partial chambers. This will enhance charge stratification in this kind of combustion process.

An optimum flow form is attained if the nozzle opening of the injection device is positioned in the area between an intake valve and an exhaust valve and has a radial distance from the cylinder axis of at least 0.3 times the piston diameter and at most 0.55 times the piston diameter.

The symmetry axis of the injection jet produced by the injection device preferably encloses an angle with a normal plane on the crankshaft axis of at least 30° and at most 60°, i.e., preferably 45°, and is directed towards the center of the cylinder. It may further be provided that the conical injection jet produced by the injection device have a cone angle β of at least 30° and at most 90°, i.e., preferably 60°.

BRIEF DESCRIPTION OF THE DRAWINGS

The invention will be further described with reference to the accompanying drawings, in which.

Parts of the same functions have the same reference numbers in all variants.

DESCRIPTION OF THE PREFERRED EMBODIMENTS

Figure 1:
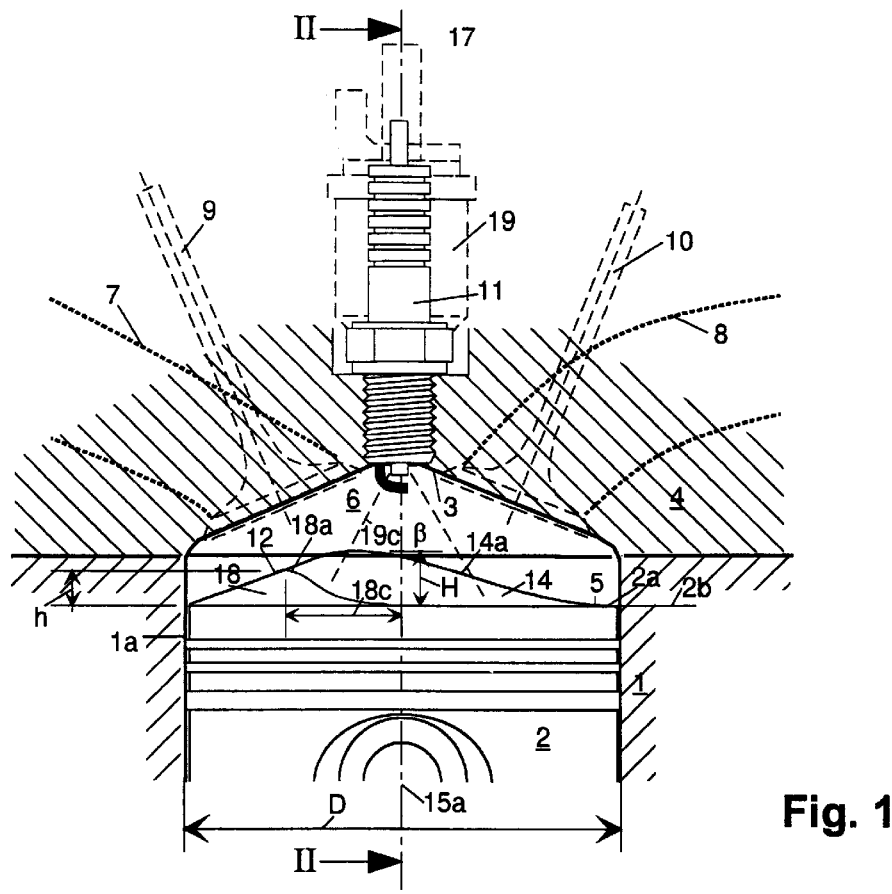
FIG. 1 is a cross-section through a four-stroke internal combustion engine in a first embodiment of the invention.

In a cylinder 1 of an internal combustion engine a reciprocating piston 2 is positioned so as to slide in longitudinal direction. The cylinder wall is referred to as 1a. The roof-shaped top 3 of the combustion chamber in the cylinder head 4 and the top face 5 of piston 2 form a combustion chamber 6 into which open two intake ports 7 and two exhaust ports 8, for example, which are indicated by dotted lines in FIG. 1. Corresponding intake and exhaust valves, which are in inclined position and are indicated by dashed lines, bear the reference numbers 9 and 10, 11 refers to a centrally positioned spark plug. Between an intake port 7 and an exhaust port 8 injection nozzle 19 is located in the area of the longitudinal center plane 17 for direct fuel injection into the combustion chamber 6 (FIG. 1).

Figure 4:
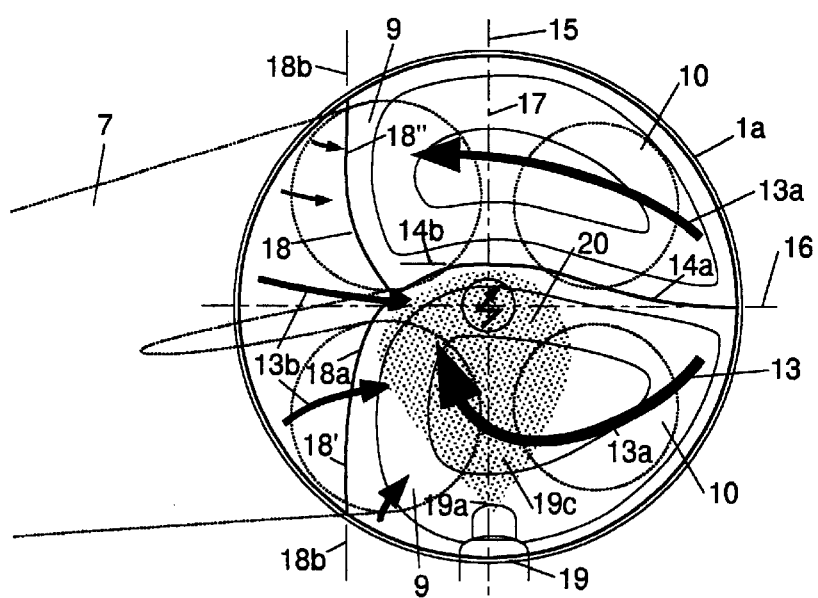
FIG. 4 shows the same engine during fuel injection, in a view in the direction of the cylinder axis.

On the piston top 5 the piston 2 is provided with a configuration of guiding ribs 12, which influence the tumble flow 13 (indicated by arrows in FIG. 4, 5) inside the cylinder to optimize the combustion process. This influence is effected on the one hand by providing for a parallel movement of the tumble flow 13 when it is deflected at the piston top 5, and on the other hand by deflecting or concentrating the fuel or fuel-air mixture in a partial area of the combustion chamber 6.

As is shown in the Figures, the guiding rib configuration 12 exhibits a longitudinal rib 14 which is positioned at a distance 14c from the cylinder axis 15a. In plan view, the upper edge 14a of the longitudinal rib has a tangent 14b which is parallel to the normal plane 16 at least in one point. By means of the longitudinal rib 14 the formation of transverse components of the tumble flow upon deflection at the piston 2 is prevented, and the fuel-air spraycloud is locally concentrated.

In addition to the longitudinal rib 14 a cross-rib 18 is provided which consists of partial ribs 18' and 18" and has a normal distance 18c relative to the longitudinal center plane 17. In plan view, the upper edge 18a of cross-rib 18 has a tangent 18b which is parallel to the longitudinal center plane 17 at least in one point. The cross-rib 18 combined with the longitudinal rib 14 assists in imparting an upwards direction to the tumble flow 13 after its deflection at the piston 2, and will thus contribute to a further reduction in the formation of secondary structures and to an increase in rotational velocity of the tumble vortex 13 near upper dead center.

The height H of the longitudinal rib 14 above a reference plane 2b defined by the outer edge 2a of the piston 2, preferably assumes its greatest possible value, which is limited by the contour of the roof 3 when the piston 2 is in upper dead center, and by the necessary clearance of the valves 9, 10. The height h of the cross-rib 18 is smaller than the maximum height H of the longitudinal rib 14.

The longitudinal rib 14 and the cross-rib 18 are approximately arranged in the shape of a "T", if seen in the direction of the cylinder axis 15a.

Figure 2:
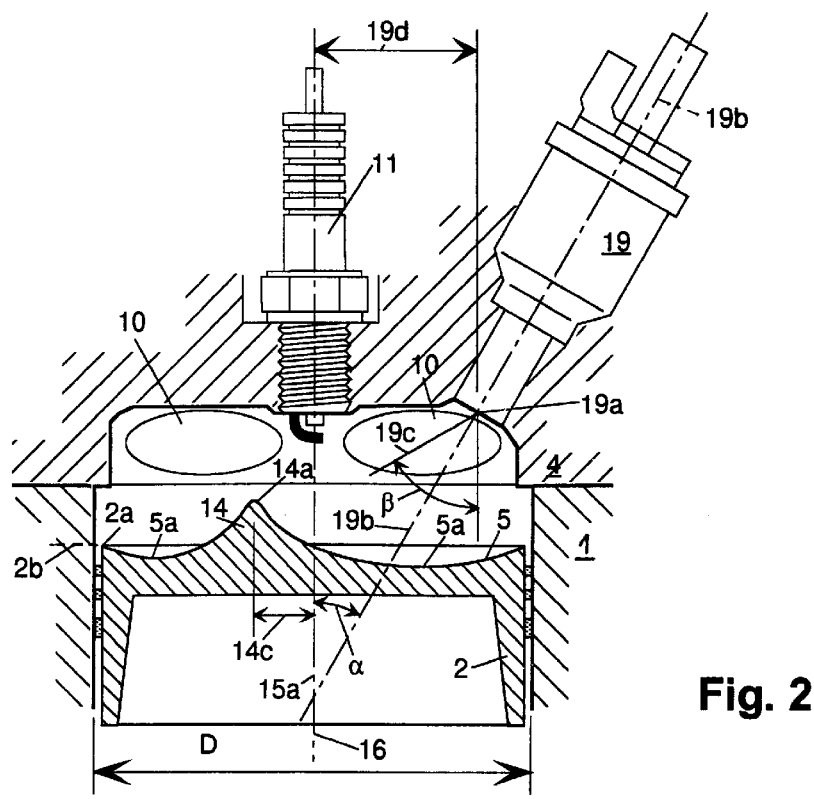
FIG. 2 is a section of the internal combustion engine along line 2—2 in FIG. 1.
Figure 3:
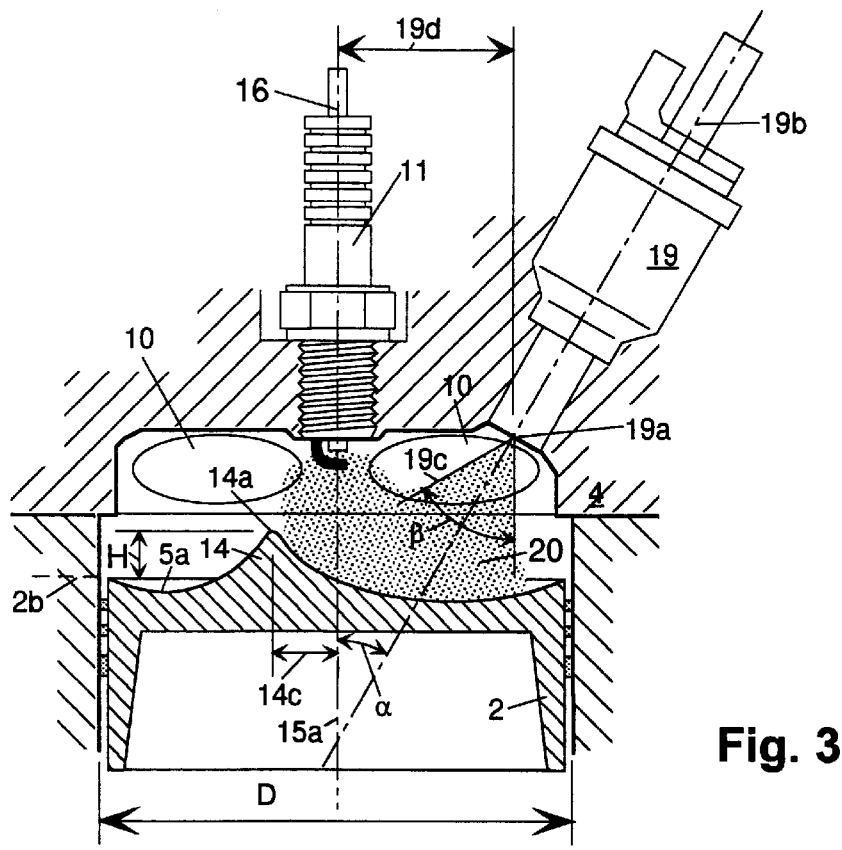
FIG. 3 shows the same engine during fuel injection, in a section corresponding to FIG. 2.

As shown in FIG. 2, the piston top 5 has continuously rounded and concave areas 5a between the longitudinal rib 14, or rather, the cross-rib 18 and the outer edge 2a of the piston, and may be located, at least partly, below the reference plane 2b defined by the outer edge 2a of the piston. The upper edge 18a of the cross-rib 18 is rounded with a radius r. The upper edge 14a of the longitudinal rib 14 preferably has a curvature radius R small enough to ensure flow separation of the injection jet 19c advancing towards the cylinder center approximately in parallel with the longitudinal center plane 17 and the air flow 13a swept along by it, which will result in an upwards direction of the flow in the central area of the cylinder 1 (FIG. 3). On the intake side a compression swirl 13b is formed by the piston 2 approaching the roof 3 of the combustion chamber in upper dead center. The symmetry axis 19b of the injection jet 19c encloses an angle a with the normal plane 16 of 30° to 60°. The cone angle $\beta$ of the injection jet 19c is 30 to 90°, i.e., preferably 60°. The nozzle opening 19a of the injection device 19 is positioned at a distance 19d from the normal plane 16. FIG. 3 shows that the fuel-air spraycloud 20 is guided towards the ignition device 11.

Figure 5:
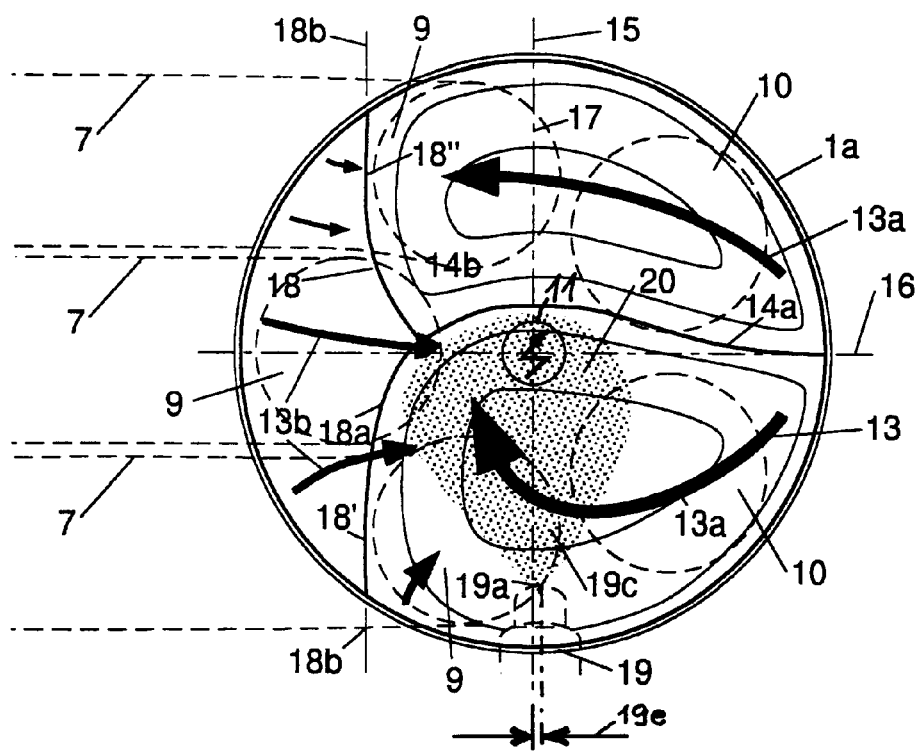
FIG. 5 shows a second variant of the invention, for an engine with three intake valves.

The type of piston described by the invention may also be used in internal combustion engines with more than two intake valves 9, as shown in FIG. 5. In such instances the injection nozzle 19 is positioned at a distance 19e from the longitudinal center plane 17.

We claim:

1. A four-stroke internal combustion engine with spark ignition and direct fuel injection into a combustion chamber, comprising:

a reciprocating piston per cylinder, and a roof-shaped combustion chamber top with one or more exhaust valves and two or more intake valves as well as intake ports generating a tumble flow in the combustion chamber and arranged on one side of a longitudinal center plane defined by a crankshaft axis and a cylinder axis, as well as a fuel injection device opening into the combustion chamber, and an ignition source located in the area of the cylinder axis in the combustion chamber roof, wherein the piston is provided on its top surface next to the combustion chamber with a substantially T-shaped configuration of flow guiding ribs, of which a longitudinal rib is placed transversely to the crankshaft axis and intersects with the longitudinal center plane, and a cross-rib which is located at a distance from the cylinder axis and extends approximately in the direction of the crankshaft axis, the fuel injection device being located in the cylinder head in the area of the longitudinal center plane of the engine.

2. A four-stroke internal combustion engine as claimed in claim 1, wherein the cross-rib extends approximately in parallel with the crankshaft axis in at least one point.

3. A four-stroke internal combustion engine as claimed in claim 1, wherein the piston top assumes a continuously curved, concave shape between the guiding ribs and an outer edge of the piston, and an injection jet being directed towards one of the concave areas obtained in this manner.

4. A four stroke internal combustion engine as claimed in claim 1, wherein the top surface of the piston is partly situated below a reference plane through an outer piston edge.

5. A four-stroke internal combustion engine as claimed in claim 1, wherein the longitudinal rib includes a rounded upper edge defining a curved part which smoothly joins with the adjacent concave piston top face.

6. A four-stroke internal combustion engine as claimed in claim 5, wherein the radius of the curved part of the longitudinal rib is 1–3 mm.

7. A four-stroke internal combustion engine as claimed in claim 5, wherein the radius of the curved part of the longitudinal rib assumes its smallest value in an area of the longitudinal center plane of the engine.

8. A four-stroke internal combustion engine as claimed in claim 1, wherein a distance between the longitudinal rib and the cylinder axis as measured in the direction of the crankshaft axis is not more than 0.2 times the piston diameter in the area of the longitudinal center plane.

9. A four-stroke internal combustion engine as claimed in claim 8, wherein the distance between the longitudinal rib and the cylinder axis is not more than 0.1 times the piston diameter.

10. A four-stroke internal combustion engine as claimed in claim 1, wherein there is a continuous transition between the longitudinal rib and the cross-rib on an intake side.

11. A four-stroke internal combustion engine as claimed in claim 1, wherein the longitudinal rib assumes a curved shape as seen in the direction of the cylinder axis.

12. A four-stroke internal combustion engine as claimed in claim 1, wherein the greatest distance between the longitudinal rib and a plane which passes through the cylinder axis and is normal to the crankshaft axis is located in the area of a plane which passes through the cylinder axis and is parallel to the crankshaft axis.

13. A four-stroke internal combustion engine as claimed in claim 1, wherein the cross-rib is predominantly positioned on the intake side.

14. A four-stroke internal combustion engine as claimed in claim 1, wherein a distance between cross-rib and cylinder axis, as measured normally to the longitudinal center plane, is 0.1 to 0.45 times the piston diameter.

15. A four-stroke internal combustion engine as claimed in claim 1, wherein the cross-rib has a height over its entire length that is smaller than the greatest height of the longitudinal rib.

16. A four-stroke internal combustion engine as claimed in claim 1, wherein the longitudinal rib has the greatest possible height, i.e., at least partly, which height is defined by the contour of the combustion chamber roof when the piston is in upper dead center, and by the necessary clearance of the valves.

17. A four-stroke internal combustion engine as claimed in claim 1, wherein a nozzle opening of the injection device is positioned in an area between an intake valve and an exhaust valve, and has a radial distance from the cylinder axis of at least 0.3 times the piston diameter and at most 0.55 times the piston diameter.

18. A four-stroke internal combustion engine as claimed in claim 1, wherein a symmetry axis of an injection jet produced by the injection device encloses an angle with a normal plane on the crankshaft axis of at least 30° and at most 60° and is directed towards the center of the cylinder as seen in the direction of the cylinder axis.

19. A four-stroke internal combustion engine as claimed in claim 18, wherein the symmetry axis of the injection jet encloses an angle with the normal plane on the crankshaft axis of 45°.

20. A four-stroke internal combustion engine as claimed in claims 1, wherein the conical injection jet produced by the injection device has a cone angle of at least 30° and at most 90°.

21. A four-stroke internal combustion engine as claimed in claim 20, wherein the conical injection jet has a cone angle of 60°.

* * * * *